(12) United States Patent
Mueller et al.

(10) Patent No.: US 7,383,024 B2
(45) Date of Patent: Jun. 3, 2008

(54) MULTI-BAND HANDSET ARCHITECTURE

(75) Inventors: William Carrol Mueller, Mountain View, CA (US); Michael Louis Frank, Menlo Park, CA (US)

(73) Assignee: Avago Technologies Wireless IP Pte Ltd, Singapore (SG)

( * ) Notice: Subject to any disclaimer, the term of this patent is extended or adjusted under 35 U.S.C. 154(b) by 438 days.

(21) Appl. No.: 11/242,286

(22) Filed: Sep. 30, 2005

(65) Prior Publication Data

US 2007/0077898 A1  Apr. 5, 2007

(51) Int. Cl.
   *H04B 1/44*  (2006.01)
(52) U.S. Cl. .................. 455/78; 455/83; 455/180.1
(58) Field of Classification Search .................. None
   See application file for complete search history.

(56) References Cited

U.S. PATENT DOCUMENTS

2002/0090974 A1  7/2002 Hagn
2006/0189277 A1*  8/2006 Ranta et al. .................. 455/78
2006/0276158 A1*  12/2006 Okabe ........................ 455/333
2007/0105506 A1*  5/2007 Kemmochi et al. ........... 455/78

FOREIGN PATENT DOCUMENTS

EP          1217756        6/2004
WO     WO 2005/088847     9/2005

* cited by examiner

*Primary Examiner*—Thanh Cong Le

(57) ABSTRACT

Architectures for a class of multi-band handsets are described. These architectures separate linearity requirements from isolation requirements and reduce the number of throws on switches requiring linearity through the use of distributed switching, filter structure placement between the switch functions, not sharing a power amplifier between frequency bands that have a Tx to Rx overlap, and simplifying the switching structure using filtering networks or multiple antennas.

7 Claims, 7 Drawing Sheets

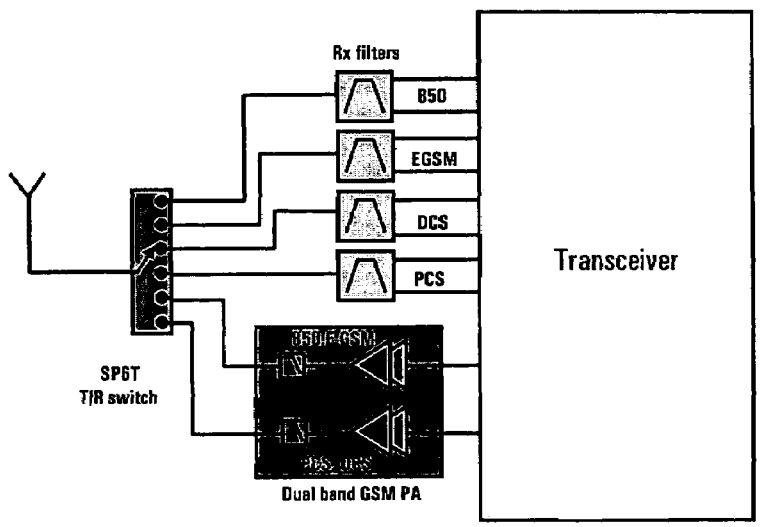
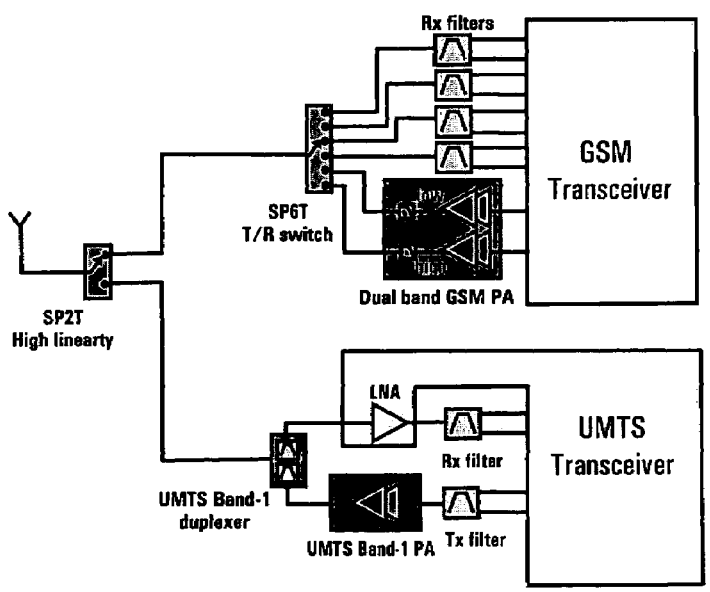

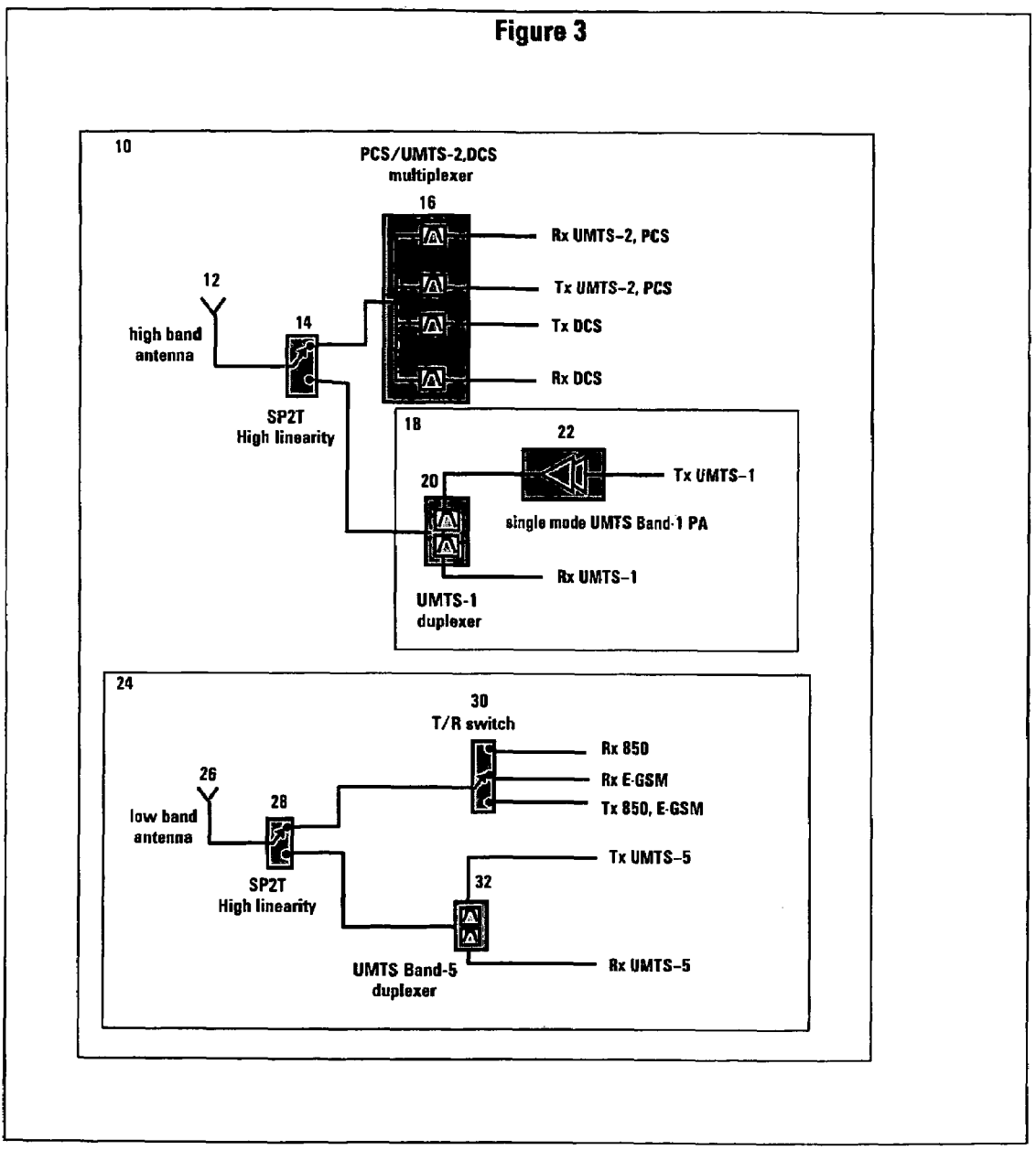

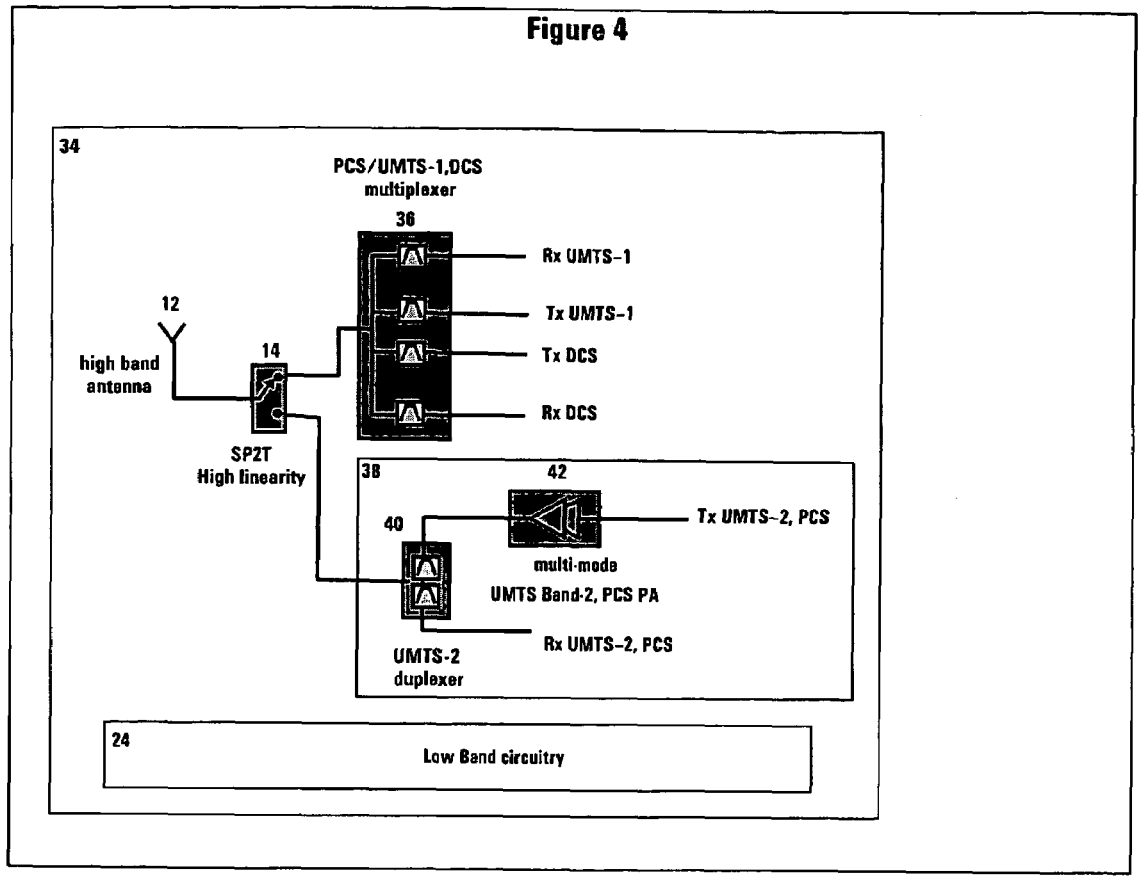

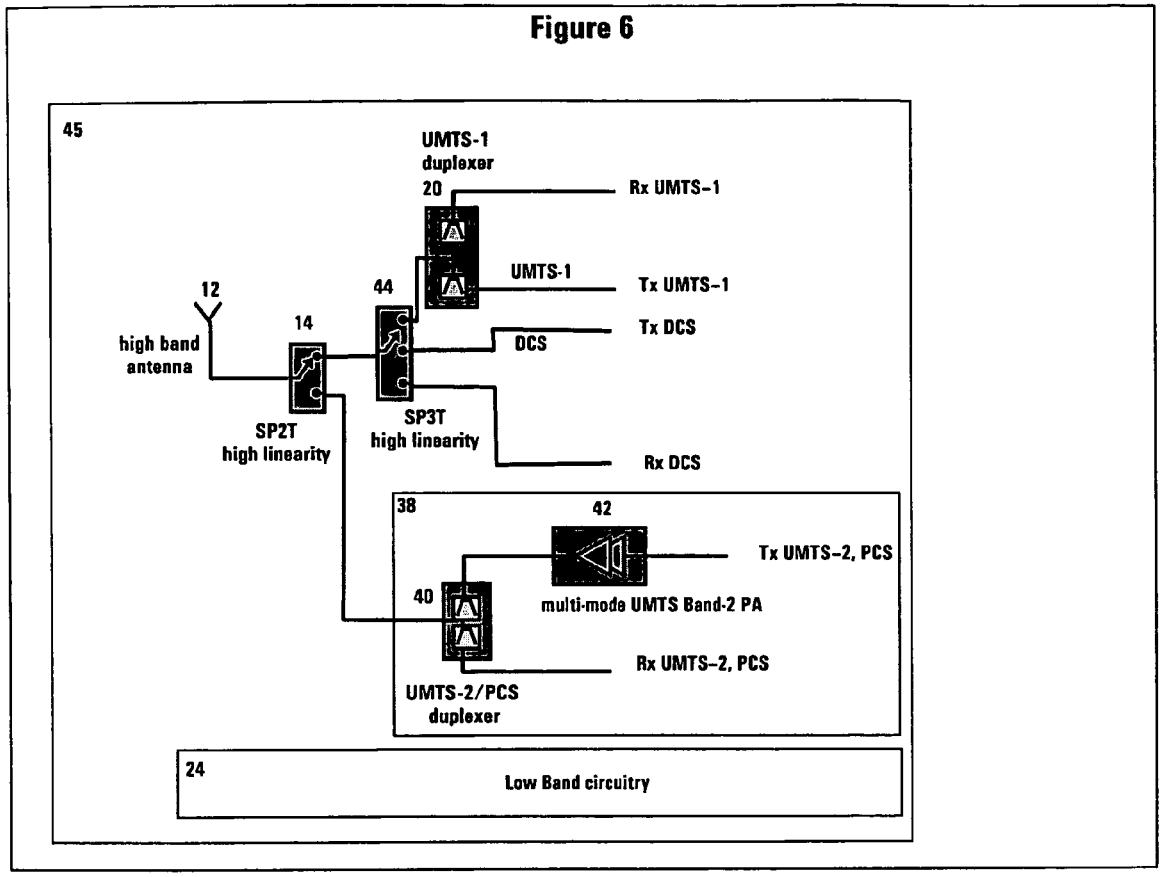

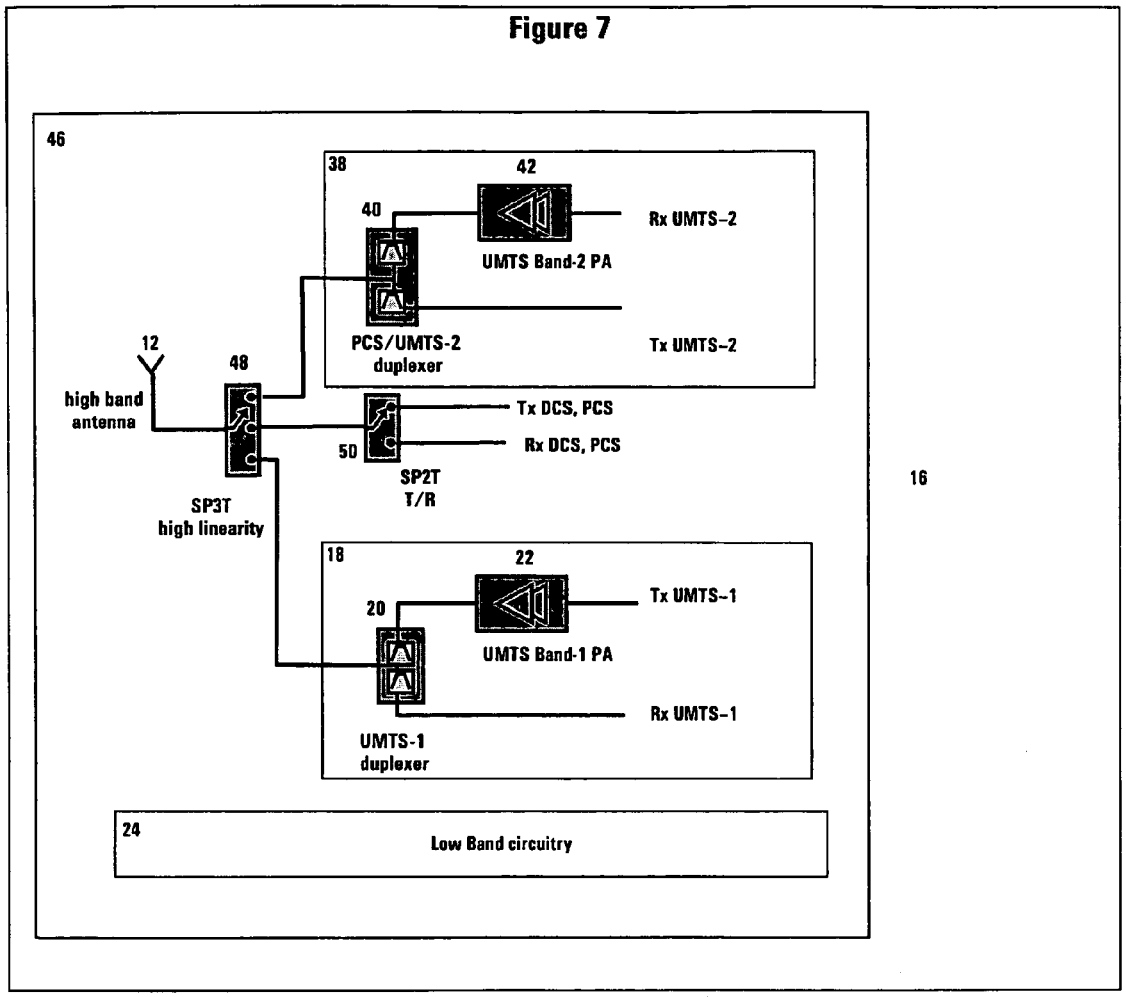

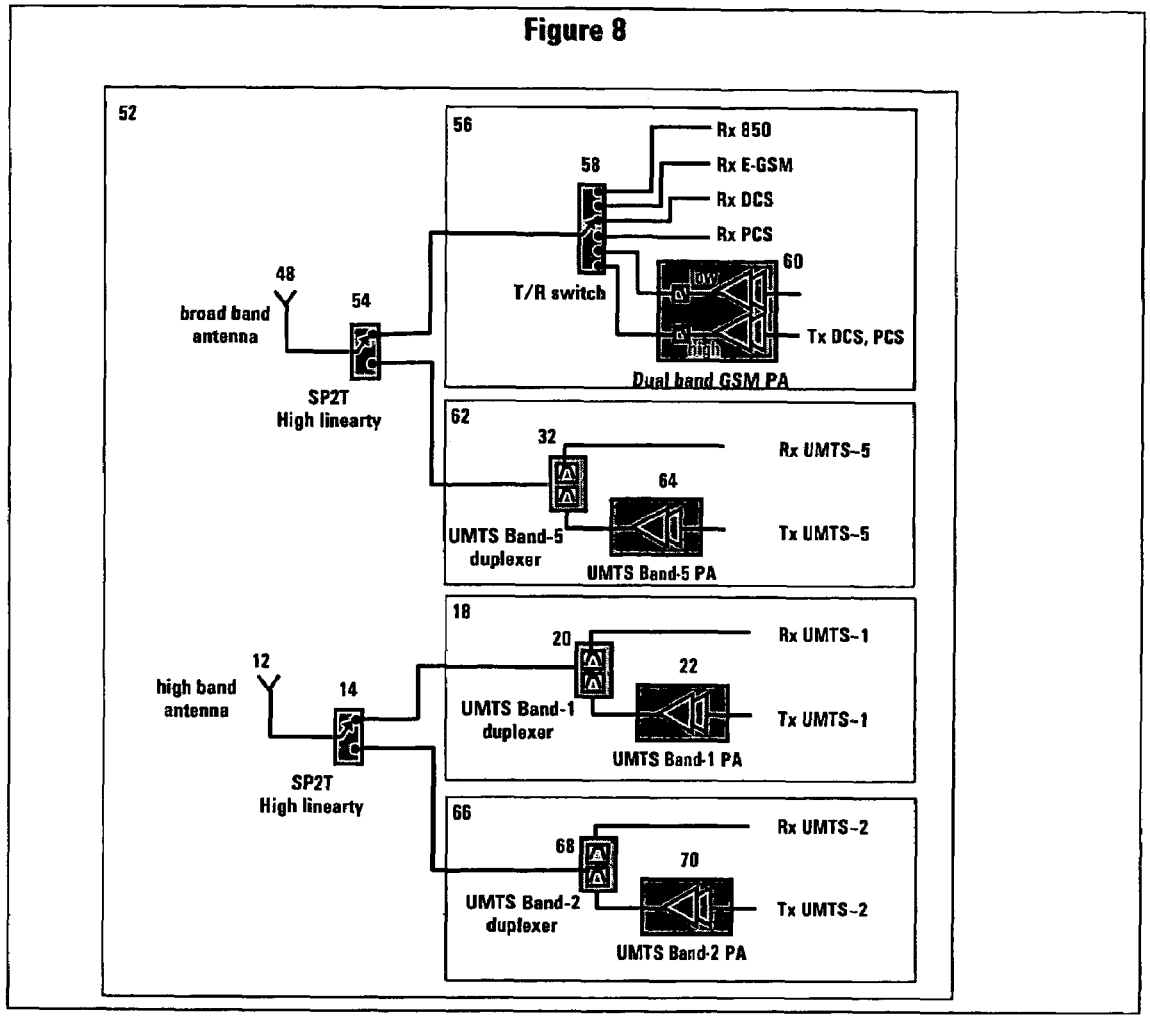

MULTI-BAND HANDSET ARCHITECTURE

BACKGROUND

Cell phones are being designed to include more bands and more modes than in the past. Under certain circumstances this can give rise to problems that degrade phone operation.

If a signal transmitted by a handset reaches a simultaneously operating receiver in the same handset at a strong enough level, it can saturate ("jam") that receiver, and prevent that receiver from receiving information. Transmitters also produce noise, random low level signals occurring outside the intended band of transmission. If noise produced by a handset transmitter reaches a simultaneously operating receiver in the same handset at a strong enough level and at the frequency of operation of the receiver, it can degrade the signal-to-noise ratio of that receiver ("desense" that receiver), decreasing the ability of that receiver to accurately receive information.

Two common methods of keeping transmitted signals from interfering with received signals are Time Division Duplexing (TDD) and Frequency Division Duplexing (FDD).

In FDD, transmission occurs in different frequency bands than reception. If the system is also full duplex, i.e. transmission and reception occur simultaneously, then a frequency selective device called a duplexer is needed to prevent "jamming" and "desense". Components of the duplexer include a transmit (Tx) filter and a receive (Rx) filter. The Tx filter is placed between the power amplifier (PA) and the antenna. This filter passes the transmitted signal with minimal attenuation, but provides high attenuation to any noise produced in the receive band, to prevent "desense". The Rx filter is placed between the low noise amplifier (LNA) and the antenna. This filter passes the received signal with minimal attenuation, but provides high attenuation to any signal produced in the transmit band, to prevent "jamming".

In TDD, transmission occurs at different times than reception. In this circumstance a transmit/receive (T/R) switch is commonly used to separate the receiver from the transmitter. If a system is both TDD and FDD, then if the transmitter is turned on and producing noise during the receive time slot, noise can "leak" across the T/R switch and "desense" the receiver. In this case a very high isolation switch is needed to avoid "desense". Such a switch is challenging to manufacture and typically has more insertion loss than a switch that provides less isolation. Typically the need for a high isolation switch can be avoided by ensuring the transmitter is off and therefore not producing noise whenever the receiver is operating. Alternately, for a standard that is both TDD and FDD, a duplexer may be used as in the FDD case.

With the inclusion of multiple frequency bands in the same handset, a special circumstance can arise when operation in one of the frequency bands is full duplex FDD and a second required frequency band has the property that the transmit frequencies of the second band overlap the receive frequencies of the full duplex FDD band. In this case signals may pass through components necessary for transmission in the second band, and reach the receiver of the first band, resulting in either "jamming" or "desense" of the receiver of the first band.

An example of such a circumstance occurs in a so-called "Quad-band GSM, Tri-band UMTS" handset. The following bands are incorporated in this handset:

| | | | |
|---|---|---|---|
| GSM 850 band | Tx 824-849 MHz | Rx 869-894 MHz | TDD, FDD |
| GSM E-GSM band | Tx 880-915 MHz | Rx 925-960 MHz | TDD, FDD |
| GSM DCS band | Tx 1710-1785 MHz | Rx 1805-1880 MHz | TDD, FDD |
| GSM PCS band | Tx 1850-1910 MHz | Rx 1930-1990 MHz | TDD, FDD |
| UMTS Band-1 | Tx 1920-1980 MHz | Rx 2110-2170 MHz | FDD, full duplex |
| UMTS Band-2 | Tx 1850-1910 MHz | Rx 1930-1990 MHz | FDD, full duplex |
| UMTS Band-5 | Tx 824-849 MHz | Rx 869-894 MHz | FDD, full duplex |

Note that UMTS Band-2 is FDD full duplex, and the UMTS Band-1 Tx frequencies overlaps the UMTS Band-2 receive frequencies.

A second significant circumstance is that UMTS systems require very linear front ends. Specifications for UMTS Band-1 called out in 3GPP TS 25.101 V3.13.0, section 7.6 require the ability to withstand a −15 dBm blocking signal (blocker) anywhere 0-2.025 GHz or 2.255-12.750 GHz while transmitting at a power level of +20 dBm. Analysis shows this translates into a Third Order Input Intercept Point (IIP3) requirement of greater than 62 dBm for the network in front of the UMTS Band-1 receiver. This is a far more stringent requirement that what is needed for operation to a GSM standard. Furthermore, this IIP3 reflects the cascade of all elements in front of the receiver, meaning that if multiple elements are required, such as duplexers and switches, each element must have sufficient linearity so that when combined, the resulting network exceeds the required 62 dBm IIP3. Thus the networks that combine the UMTS Band-1 receive path with the networks needed for other bands must be extremely linear.

In general the linearity of a switch decreases as more throws are added. Each additional throw has non-idealities that contribute incremental distortion and lower the intercept point of the switch. High isolation in switches is typically achieved by cascading throws; thus simultaneously achieving both high isolation and high linearity in the same switch is very challenging, with the situation worsening as more throws are added.

To date most handsets have not encountered the special circumstance described above. Common multi-band handsets include "Quad-band GSM" and more recently "Quad-band GSM plus UMTS Band-1".

A "Quad-band GSM" handset includes the first four bands listed above. A typical architecture is shown in FIG. 1. The PAs for the 850 and E-GSM bands are combined into a single element, as are the PAs for the DCS and PCS bands. A single-pole six-throw (SP6T) switch is used to combine the bands to a single antenna, and also serves as the T/R switch for each band. A receive filter is used for each band to prevent jamming from out of band signals. Although the Tx of the PCS band overlaps with the Rx of the DCS band, and also the Tx of the E-GSM band overlaps with the Rx of the 850 band, since operation is TDD, the transmitters and receivers are not operating simultaneously so "desense" and "jamming" are avoided. The T/R switch has only moderate isolation requirements. Since no UMTS signals occur in this system, there is no high linearity requirement on the T/R switch.

A "Quad-band GSM plus UMTS Band-1" handset includes the first 5 bands listed above. A typical architecture is shown in FIG. 2. A SP2T switch is used to combine the UMTS Band-1 circuitry with a Quad-band GSM network such as is described above. The UMTS Band-1 circuitry includes a duplexer, a separate PA, and receive and transmit filters. Although UMTS Band-1 is FDD full duplex and there is overlap between PCS and UMTS Band-1, it is the Tx of the UMTS Band-1 band that overlaps with the Rx of the PCS band. As the UMTS Band-1 transmitter and the PCS receiver are not operated at the same time (so called "compressed mode"), "desense" and "jamming" are avoided. The SP2T switch needs a high intercept point in order to handle the UMTS Band-1 signals, but this requirement is mitigated by minimizing the number of throws needed. As the PA for UMTS Band-1 is separate from the PA for PCS, it can be turned off during PCS operation. This removes the noise source, so eliminates the need for high isolation in the SP2T switch.

SUMMARY

The invention relates to a class of architectures for handsets that include one frequency band ("Band A") that is full duplex FDD, a second frequency band ("Band B") that is FDD and has the property that some of the transmit frequencies of Band B overlap some of the receive frequencies of Band A, and a third frequency band ("Band C") that shares an antenna with the first two bands. One aspect of these architectures is the use of separate power amplifiers (PAs) to amplify the transmit signals for Band A and Band B. A second aspect minimizes the number of throws used on an antenna switch that selects which band is connected to the antenna, and to not burden this switch with simultaneous requirements for high linearity and high isolation. In most variations the need for high isolation switching is avoided; in variations where high isolation is required this functionality is separated from any need for high linearity.

By using separate PAs for Band A and Band B, the problem of "desense" due to the leakage of noise from the Band B PA into the Band A receiver can be avoided by turning off the Band B PA. In some cases the need for a third PA can be avoided by combining the PA for band C with either the PA for Band B or with the PA for Band A.

A switch with a small number of throws is used to select which frequency band becomes connected to the antenna. While this switch generally needs to be highly linear, by reducing the number of throws required it becomes as easy to implement as possible, and because of the use of separate PAs for Bands A and B this switch does not need to provide high levels of isolation.

If Band C is FDD, a multiplexer can be used to entirely eliminate the need for high isolation switches. This multiplexer functions much like a duplexer. It contains two Tx filters, each of which pass one transmit band while significantly reducing noise transmission in either Rx band to avoid self "desense", and two Rx filters, each of which pass one Rx band while providing significant rejection in both Tx bands to avoid self "jamming".

Alternately, a T/R switch and Rx filter for band C can replace the band C Tx and Rx filter functionality in the multiplexer, while the Tx and Rx filters for the other band are retained as a duplexer. This T/R switch may also need to have a high intercept point, and by virtue of having at least 3 throws may be more difficult than the antenna switch to implement. Additionally, the switch on the output of the shared PA must now be high isolation to make sure noise from band C does not leak through the switches and "desense" the receiver for the band sharing the PA with Band C.

A third option is to uses separate power amplifiers for all three bands. In this case the linear antenna switch must support at least 3 poles. However the use of separate power amplifiers for all three bands eliminates the need for high isolation T/R switching on band C; only conventional moderate isolation T/R switching is required.

BRIEF DESCRIPTION OF THE DRAWINGS

FIG. 1 illustrates an architecture of the prior art.
FIG. 2 illustrates an architecture of the prior art.
FIG. 3 illustrates an embodiment of the present invention.
FIG. 4 illustrates an embodiment of the present invention.
FIG. 6 illustrates an embodiment of the present invention.
FIG. 7 illustrates an embodiment of the present invention.
FIG. 8 illustrates an embodiment of the present invention.

DETAILED DESCRIPTION

Figure 5:
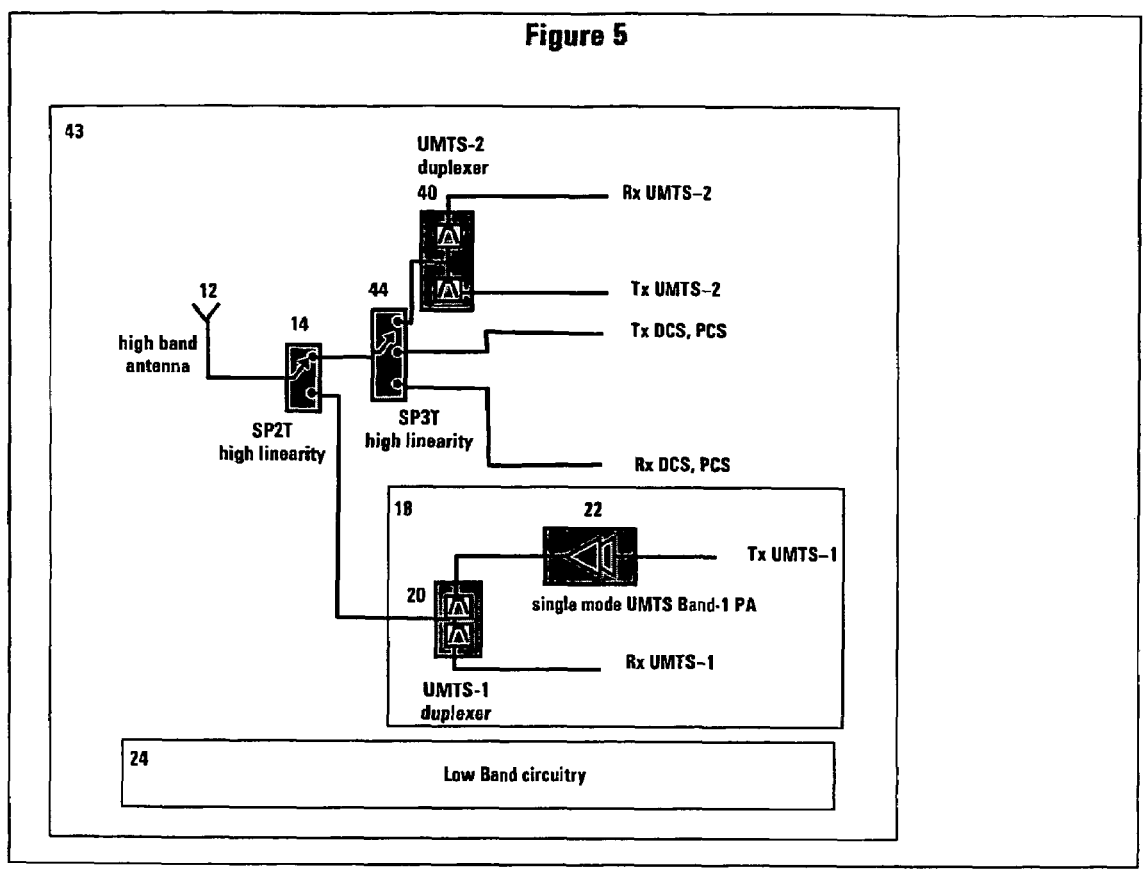
FIG. 5 illustrates an embodiment of the present invention.

The invention relates to a class of architectures for handsets that include one frequency band ("Band A") that is full duplex FDD, a second frequency band ("Band B") that is FDD and has the property that some of the transmit frequencies of Band B overlap some of the receive frequencies of Band A, and a third frequency band ("Band C") that shares an antenna with the first two bands. One aspect of these architectures is the use of separate PAs to amplify the transmit signals for Band A and Band B. A second aspect is minimizing the number of throws used on a switch (called the "antenna switch") that selects which band is connected to the antenna, and to not burden this switch with simultaneous requirements for high linearity and high isolation. In most variations the need for high isolation switching is avoided; in variations where high isolation is required this functionality is separated from any need for high linearity.

By using separate PAs for Band A and Band B, the problem of "desense" due to the leakage of noise from the Band B PA into the Band A receiver can be avoided by turning off the Band B PA. In some cases the need for a third PA can be avoided by combining the PA for band C with either the PA for Band B or with the PA for Band A.

A switch with a small number of throws is used to select which frequency band becomes connected to the antenna. While this switch generally needs to be highly linear, by reducing the number of throws required it becomes as easy to implement as possible, and because of the use of separate PAs for Bands A and B this switch does not need to provide high levels of isolation.

If Band C is FDD, a multiplexer can be used to entirely eliminate the need for high isolation switches. This multiplexer functions much like a duplexer. It contains two Tx filters, each of which pass one transmit band while significantly reducing noise transmission in either Rx band to avoid self "desense", and two Rx filters, each of which pass one Rx band while providing significant rejection in both Tx bands to avoid self "jamming".

Alternately, a transceive (T/R) switch and Rx filter for band C can replace the band C Tx and Rx filter functionality in the multiplexer, while the Tx and Rx filters for the other band are retained as a duplexer. This T/R switch may also need to have a high intercept point, and by virtue of having at least 3 throws may be more difficult than the antenna switch to implement. Additionally, the switch on the output of the shared PA must now be high isolation to make sure noise from band C does not leak through the switches and "desense" the receiver for the band sharing the PA with Band C.

A third option is to uses separate power amplifiers for all three bands. In this case the linear antenna switch must support at least 3 poles. However the use of separate power amplifiers for all three bands eliminates the need for high isolation T/R switching on band C; only conventional moderate isolation T/R switching is required.

Illustrative examples follow. In these examples a Quad-band GSM, Tri-band UMTS phone is postulated where the GSM 850, GSM E-GSM and UMTS Band-5 circuitry ("low bands") share one antenna and GSM DCS, GSM PCS, UMTS Band-1 and UMTS Band-2 circuitry ("high bands") share a second antenna. This handset contains a full duplex FDD band (UMTS Band-2), a second FDD band (UMTS Band-1) where the Tx frequency overlaps the Rx frequency of the first band, and a third band (GSM DCS) sharing an antenna with the first two bands.

FIG. 3 illustrates a circuit topology 10 according to the present invention. The high band circuitry includes a high band antenna 12 connecting to a high linearity single pole 2 throw (SP2T) switch 14. A first throw of the SP2T switch 14 is connected to the input of a multiplexer 16. The multiplexer 16 passes UMTS-2, PCS and DCS.

A second throw of the SP2T switch 14 connects to the UMTS Band-1 circuitry 18. The UMTS Band-1 circuitry 18 consists of a linear duplexer 20 that connects to the SP2T switch 14. A dedicated single mode power amplifier (PA) 22 passes the transmit band of UMTS-1 to the duplexer 20. The duplexer 20 further receives the receive band of UMTS-1.

The low band circuitry 24 includes a low band antenna 26 connecting to a high linearity SP2T switch 28. A first throw of the SP2T switch 28 connects to a high linearity single pole 3 throw (SP3T) switch 30. The SP3T swith passes GSM 850 and E-GSM. A second throw of the SP2T switch 26 connects to a duplexer 32 that transceives UMTS-5.

FIG. 4 illustrates a circuit topology 34 according to the present invention. The high band circuitry includes a high band antenna 12 connecting to a high linearity single pole 2 throw (SP2T) switch 14. A first throw of the SP2T switch 14 is connected to the input of a multiplexer 36. The multiplexer 36 passes UMTS-1 and DCS.

A second throw of the SP2T switch 14 connects to the UMTS Band-2 circuitry 38. The UMTS Band-2, PCS circuitry 38 consists of a linear duplexer 40 that connects to the SP2T switch 14. A dedicated single mode power amplifier (PA) 42 passes the transmit band of UMTS-2, PCS to the duplexer 40. The duplexer 40 further receives the receive band of UMTS-2, PCS.

The low band circuitry 24 is identical to the low band circuitry shown in FIG. 3.

FIG. 5 illustrates a circuit topology 43 according to the present invention. The high band circuitry includes a high band antenna 12 connecting to a high linearity single pole 2 throw (SP2T) switch 14. The first throw of the SP2T switch 14 connects to a pole of a SP3T switch 44. A first throw of the SP3T switch 44 connects to a duplexer 40 that passes UMTS-2. A second throw of the SP3T switch 44 passes the transmit band of DCS, PCS while a third throw of the SP3T switch 44 passes the receive band of DCS, PCS.

A second throw of the SP2T switch 14 connects to the UMTS Band-1 circuitry 18, shown in FIG. 3. The low band circuitry 24 is identical to the low band circuitry shown in FIG. 3.

FIG. 6 illustrates a circuit topology 45 according to the present invention. The high band circuitry includes a high band antenna 12 connecting to a high linearity single pole 2 throw (SP2T) switch 14. The first throw of the SP2T switch 14 connects to a pole of a SP3T switch 44. A first throw of the SP3T switch 44 connects to a duplexer 20 that transceives UMTS-1. A second throw of the SP3T switch 44 passes the transmit band of DCS while a third throw of the SP3T switch 44 passes the receive band of DCS.

A second throw of the SP2T switch 14 connects to the UMTS Band-2 circuitry 38, shown in FIG. 4. The low band circuitry 24 is identical to the low band circuitry shown in FIG. 3.

FIG. 7 illustrates a circuit topology 46 according to the present invention. The high band circuitry includes a high band antenna 12 connecting to a high linearity single pole 3 throw (SP3T) switch 48. A first throw of the SP3T switch 48 connects to the UMTS-2 Band circuitry 38, as illustrated in FIG. 4. A second throw of the SP3T switch 48 connects to a pole of a SP2T switch 50 that passes the DCS, PCS bands. A third throw of the SP3T switch 48 connects to the UMTS-1 band circuitry 18, shown in FIG. 3. The low band circuitry 24 is identical to the low band circuitry shown in FIG. 3.

FIG. 8 illustrates a circuit topology 52 according to the present invention. A broadband antenna 48 connects to a pole of a single pole 2 throw (SP2T) switch 54. A first throw of the SP2T switch 54 connects to a single pole multi-throw switch 58 that receives GSM 850, E-GSM, DCS, and PCS. Two of the throws of multi-throw switch 58 connect to the outputs of dual band GSM power amplifier 60. One input of the dual band GSM power amplifier 60 passes the transmit bands of GSM-850 and E-GSM while the other input passes the transmit bands of DCS, PCS.

A high-band antenna 12 connects to a high linearity single pole 2 throw (SP2T) switch 14. The first throw of the SP2T switch 14 connects to UMTS Band 1 circuitry 18, illustrated in FIG. 3 while a second throw of the SP2T switch 14 connects to UMTS Band 2 circuitry 34. The UMTS Band-2 circuitry 66 consists of a linear duplexer 68 that connects to the SP2T switch 14. A dedicated single mode power amplifier (PA) 70 passes the transmit band of UMTS-2 to the duplexer 68. The duplexer 68 further receives the receive band of UMTS-2.

The invention claimed is:

1. A multi-band architecture comprising:
   a first antenna;
   a first switch having a pole connected to the first antenna;
   a filtering network passing at least two frequency bands, having an input connected to one throw of the first switch;
   a first duplexer, connected to a second throw of the first switch, passing one of a transmit band overlapping a receive band passed by the filtering network and a receive band overlapping a transmit band passed by the filtering network; and
   a first power amplifier having an output connected to a transmit filter of the first duplexer.

2. A multi-band architecture, as in claim 1, further comprising:
   a second antenna;
   a second switch having a pole connected to the second antenna;
   a third switch having a pole connected to a first throw of the second switch; and
   a second duplexer connected to a second throw of the second switch.

3. A multi-band architecture comprising:
a first antenna;
a first switch having a pole connected to the first antenna;
a second switch having a pole connected to a first throw of the first switch and a first throw that passes a receive band;
a first duplexer connected to a second throw of the second switch;
a second duplexer, connected to a second throw of the first switch, passing one of a transmit band overlapping a receive band passed by the first duplexer and a receive band overlapping a transmit band passed by the first duplexer; and
a first power amplifier having an output connected to a transmit filter of the second duplexer.

4. A multi-band architecture as in claim 3 further comprising:
a second antenna;
a second switch having a pole connected to the second antenna;
a third switch having a pole connected to a first throw of the second switch; and
a second duplexer connected to a second throw of the second switch.

5. A multi-band architecture comprising:
a first antenna;
a first switch having a pole connected to the first antenna;
a first duplexer connected to a first throw of the first switch;
a first power amplifier connected to a transmit filter of the first duplexer;
a second duplexer connected to a second throw of the first switch, passing a receive band that overlaps with a transmit band passed by the first duplexer; and
a second power amplifier connected to a transmit filter of the second duplexer; and
a second switch, having a pole connected to a third throw of the first switch.

6. A multi-band architecture as in claim 5 further comprising:
a second antenna;
a second switch having a pole connected to the second antenna;
a third switch having a pole connected to a throw of the second switch; and
a second duplexer connected to a second throw of the second switch.

7. A multi-band architecture comprising:
a first antenna;
a first switch having a pole connected to the first antenna;
a first duplexer connected to a first throw of the first switch;
a first power amplifier having an output connected to a transmit filter of the first duplexer;
a second switch having a pole connected to the first switch;
a second antenna;
a third switch having a pole connected to the second antenna;
a second duplexer connected to a first throw of the third switch;
a second power amplifier having an output connected to a transmit filter of the second duplexer;
a third duplexer, connected to a second throw of the third switch, passing a transmit band that overlaps with a receive band passed by the second duplexer; and
a third power amplifier having an output connected to a transmit filter of the third duplexer.

* * * * *